United States Patent
Yamamoto et al.

(10) Patent No.: US 10,859,161 B2
(45) Date of Patent: Dec. 8, 2020

(54) SHIFT DEVICE

(71) Applicant: KABUSHIKI KAISHA TOKAI-RIKA-DENKI-SEISAKUSHO, Aichi-ken (JP)

(72) Inventors: Makoto Yamamoto, Aichi-ken (JP); Munetoshi Makimura, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 155 days.

(21) Appl. No.: 16/004,792

(22) Filed: Jun. 11, 2018

(65) Prior Publication Data

US 2018/0363774 A1  Dec. 20, 2018

(30) Foreign Application Priority Data

Jun. 20, 2017   (JP) ................................. 2017-120482

(51) Int. Cl.
| | |
|---|---|
| *F16H 61/22* | (2006.01) |
| *F16H 59/08* | (2006.01) |
| *G05G 1/10* | (2006.01) |
| *F16H 61/18* | (2006.01) |
| *G05G 5/18* | (2006.01) |
| *F16H 61/16* | (2006.01) |
| *G05G 5/04* | (2006.01) |
| *F16H 61/24* | (2006.01) |

(52) U.S. Cl.
CPC ............. *F16H 61/22* (2013.01); *F16H 59/08* (2013.01); *F16H 61/16* (2013.01); *F16H 61/18* (2013.01); *F16H 61/24* (2013.01); *G05G 1/10* (2013.01); *G05G 5/04* (2013.01); *G05G 5/18* (2013.01); *F16H 2059/081* (2013.01)

(58) Field of Classification Search
CPC .... F16H 61/22; F16H 2059/081; F16H 61/24; G05G 1/10; G05G 5/04; G05G 5/18
USPC .......... 74/473.21, 473.25, 473.3, 813 L, 553
See application file for complete search history.

(56) References Cited

U.S. PATENT DOCUMENTS

| | | | | |
|---|---|---|---|---|
| 4,815,339 | A * | 3/1989 | Bonadies ............. | B23Q 16/001 192/139 |
| 8,051,740 | B2 | 11/2011 | Giefer et al. | |
| 9,959,988 | B2 * | 5/2018 | Pan ......................... | H01H 9/20 |
| 2006/0037424 | A1 * | 2/2006 | Pickering ............... | B60K 37/06 74/473.3 |

(Continued)

FOREIGN PATENT DOCUMENTS

| | | | |
|---|---|---|---|
| JP | H02-048433 U | 4/1990 | |
| JP | H08-328094 A | 12/1996 | |

(Continued)

*Primary Examiner* — Joseph Brown
(74) *Attorney, Agent, or Firm* — Roberts Calderon Safran & Cole P.C.

(57) ABSTRACT

A shift device for a vehicle, the shift device comprising: a shift body that is moved to change a shift position; and a restriction section provided with a first restriction member and a second restriction member, configured such that actuation of the first restriction member restricts movement of the shift body to a plurality of shift positions or within a shift range, and configured such that actuation of the first restriction member and the second restriction member, or actuation of the second restriction member alone, restricts movement of the shift body to a shift position.

4 Claims, 6 Drawing Sheets

(56) References Cited

U.S. PATENT DOCUMENTS

| | | | | |
|---|---|---|---|---|
| 2008/0115613 A1* | 5/2008 | Giefer | B60K 37/06 | 74/473.21 |
| 2009/0000407 A1* | 1/2009 | Meyer | B60K 37/06 | 74/10.1 |
| 2009/0107287 A1* | 4/2009 | Seki | B60K 37/06 | 74/504 |
| 2009/0217782 A1* | 9/2009 | Wang | G05G 5/24 | 74/473.21 |
| 2013/0313086 A1* | 11/2013 | Redwood | F16H 59/02 | 200/61.88 |
| 2014/0007726 A1* | 1/2014 | Muraki | F16H 61/22 | 74/473.3 |
| 2015/0027861 A1* | 1/2015 | Hoskins | F16H 59/08 | 200/43.11 |
| 2015/0152958 A1* | 6/2015 | Watanabe | F16H 61/22 | 74/473.12 |
| 2015/0167827 A1* | 6/2015 | Fett | F16H 59/08 | 74/473.3 |
| 2015/0285351 A1* | 10/2015 | Rake | G05G 1/08 | 74/436 |
| 2015/0369357 A1* | 12/2015 | Lee | F16H 59/08 | 74/504 |
| 2015/0369358 A1* | 12/2015 | Lee | F16H 59/08 | 74/507 |
| 2016/0138704 A1* | 5/2016 | Watanabe | F16H 59/08 | 74/473.23 |
| 2016/0138705 A1* | 5/2016 | Kim | F16H 59/08 | 74/473.2 |
| 2016/0238128 A1* | 8/2016 | Rake | F16H 59/08 | |
| 2016/0245396 A1* | 8/2016 | Behounek | F16H 59/08 | |
| 2016/0245403 A1* | 8/2016 | Rake | F16H 61/22 | |
| 2016/0312882 A1* | 10/2016 | Heo | F16H 59/08 | |
| 2017/0074391 A1* | 3/2017 | Tebbe | F16H 59/08 | |
| 2017/0175884 A1* | 6/2017 | Watanabe | F16H 61/24 | |
| 2018/0038478 A1* | 2/2018 | Arakawa | B60K 20/02 | |
| 2018/0164900 A1* | 6/2018 | Merminod | G06F 3/04847 | |

FOREIGN PATENT DOCUMENTS

| | | |
|---|---|---|
| JP | 2790826 B | 8/1998 |
| JP | 2008-526605 A | 7/2008 |
| KR | 10-2012-0139881 A | 12/2012 |
| WO | 2015/107592 A1 | 7/2015 |

* cited by examiner

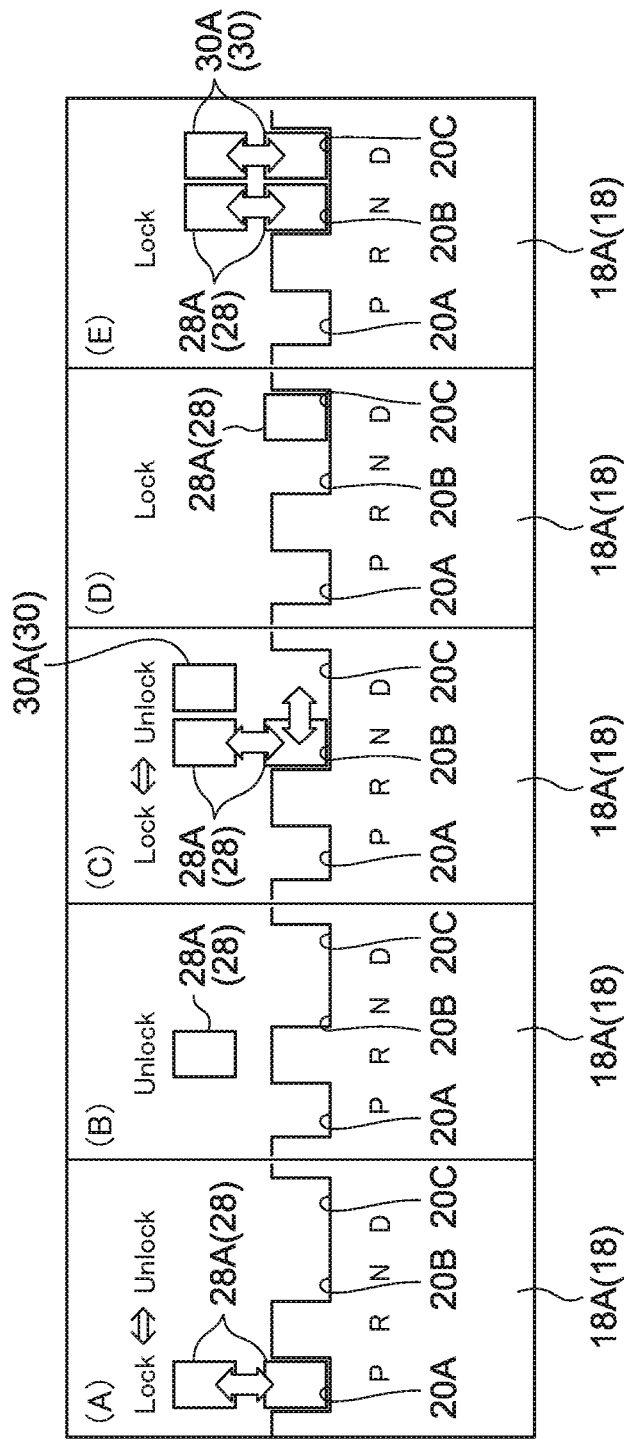

SHIFT DEVICE

CROSS-REFERENCE TO RELATED APPLICATION

This application claims priority under 35 USC 119 from Japanese Patent Application No. 2017-120482 filed Jun. 20, 2017, the disclosure of which is incorporated by reference herein in its entirety.

BACKGROUND

Technical Field

The present disclosure relates to a shift device for a vehicle in which a shift body is moved to change a shift position of the shift body.

Related Art

In a shift operation device described in the pamphlet of International Publication (WO) No. 2015/107592, a first stopper is actuated to restrict rotation of a first clutch gear at a shift position.

In such a shift operation device, sometimes it would be preferable to be able to restrict rotation of the first clutch gear within a range of plural shift positions.

SUMMARY

In consideration of the above circumstances, the present disclosure obtains a shift device capable of restricting movement of a shift body within a range of plural shift positions.

A shift device for a vehicle of a first aspect of the present disclosure includes a shift body and a restriction section. The shift body is moved to change a shift position. The restriction section is provided with a first restriction member and a second restriction member. The first restriction member and the second restriction member are configured such that actuation of the first restriction member restricts movement of the shift body to plural shift positions or within a shift range, and configured such that actuation of the first restriction member and the second restriction member, or actuation of the second restriction member alone, restricts movement of the shift body to a shift position.

A shift device of a second aspect of the present disclosure, in the shift device of the first aspect of the present disclosure, further includes a rotating member that rotates to actuate the first restriction member and the second restriction member.

A shift device of a third aspect of the present disclosure, in the shift device of the second aspect of the present disclosure, further includes a first actuation portion and a second actuation portion. The first actuation portion is provided at the rotating member, and actuates the first restriction member in a case in which the rotating member is rotated. The second actuation portion is provided at the rotating member, and actuates the second restriction member in a case in which the rotating member is rotated.

In a shift device of a fourth aspect of the present disclosure, in the shift device of any one of the first aspect to the third aspect of the present disclosure, the first restriction member and the second restriction member are disposed so as to be superimposed one on another in a direction of a rotation axis of the rotating member.

In the shift device of the first aspect of the present disclosure, the shift body is moved to change the shift position of the shift body.

The restriction section is provided with the first restriction member and the second restriction member. Actuation of the first restriction member restricts movement of the shift body to the plural shift positions or within the shift range of plural shift positions. Moreover, actuation of the first restriction member and the second restriction member, or actuation of the second restriction member alone, restricts movement of the shift body to a shift position. This thereby enables movement of the shift body to be restricted within the ranges of the plural shift positions.

In the shift device of the second aspect of the present disclosure, rotating the rotating member actuates the first restriction member and the second restriction member. This thereby enables the first restriction member and the second restriction member to be actuated with a simple configuration.

In the shift device of the third aspect of the present disclosure, the rotating member is provided with the first actuation portion and the second actuation portion. When the rotating member is rotated, the first actuation portion actuates the first restriction member, and the second actuation portion actuates the second restriction member. This thereby enables both the first restriction member and the second restriction member to be actuated by rotation of the rotating member.

In the shift device of the fourth aspect of the present disclosure, the first restriction member and the second restriction member are disposed so as to be superimposed one on another in the direction of the rotation axis of the rotating member. The first restriction member is thus capable of restricting movement in a certain direction of the second restriction member, and the second restriction member is capable of restricting movement in a certain direction of the first restriction member.

BRIEF DESCRIPTION OF THE DRAWINGS

An exemplary embodiment will be described in detail based on the following figures, wherein:

FIG. 6 is a schematic drawing illustrating locking and unlocking of rotation of a knob in a shift device according to an exemplary embodiment of the present disclosure.

DETAILED DESCRIPTION

Figure 1:
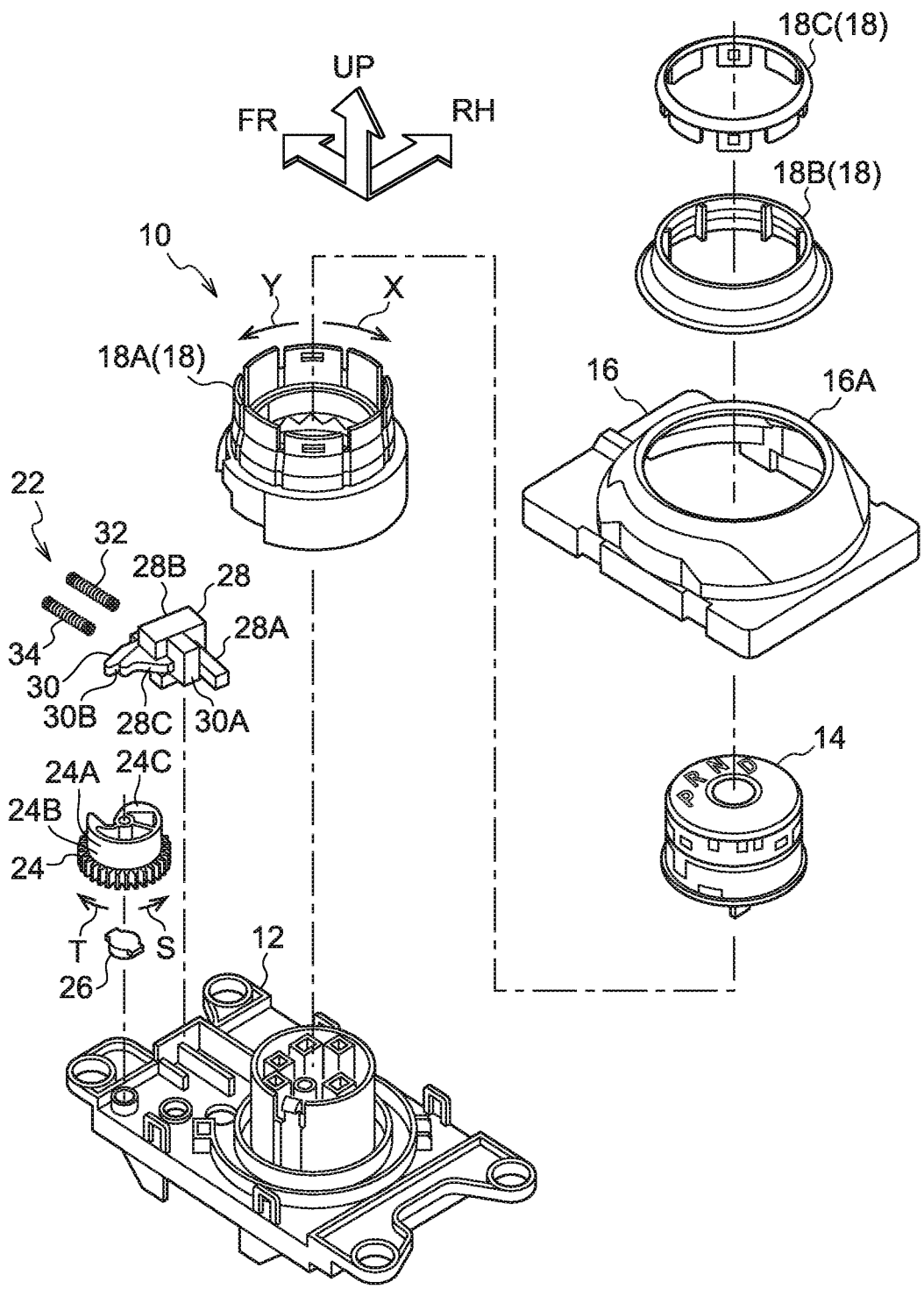
FIG. 1 is an exploded perspective view from a left side and rear side, illustrating a shift device according to an exemplary embodiment of the present disclosure.

FIG. 1 is an exploded perspective view illustrating a shift device 10 according to an exemplary embodiment of the present disclosure, as viewed from a left side and rear side.

In the drawings, an arrow FR indicates a front side of the shift device 10, an arrow RH indicates a right side of the shift device 10, and an arrow UP indicates an upper side of the shift device 10.

The shift device 10 according to the present exemplary embodiment is installed to a console (vehicle body side) of a vehicle, and is disposed at a vehicle front side and a vehicle width direction inner side of a driver's seat (not illustrated in the drawings) of the vehicle. The front, right, and upper side of the shift device 10 respectively face an oblique front upper side of the vehicle, a right side of the vehicle, and an oblique rear upper side of the vehicle.

As illustrated in FIG. 1, the shift device 10 is provided with a substantially rectangular plate 12, serving as a support member, and configuring an installed body. The plate 12 is fixed inside the console, and is disposed so as to be perpendicular to an up-down direction. A panel 14, that has a bottomed cylindrical shape and that serves as a display member configuring the installed body, is fixed at an upper side of the plate 12. The panel 14 passes through the console such that an upper face (base face) of the panel 14 is exposed to a vehicle cabin interior.

A substantially rectangular box shaped housing 16, serving as a covering member and configuring the installed body, is fixed to an upper side of the plate 12. An interior of the housing 16 is open toward a lower side, and the housing 16 covers the upper side of the plate 12. An upper wall of the housing 16 is formed with a pierced cylinder 16A that has a substantially frustoconical cylinder shape. An interior of the pierced cylinder 16A is in communication with the interior of the housing 16 at a lower side, and the panel 14 passes through the interior of the pierced cylinder 16A coaxially with the cylinder 16A.

A substantially cylindrical knob 18, serving as a shift body, is supported at the upper side of the plate 12. The knob 18 is provided with a substantially cylindrical knob base 18A, serving as a main body. The knob base 18A is capable of rotating within a predetermined range with respect to the plate 12. The panel 14 passes coaxially through an interior of the knob base 18A, and the knob base 18A passes coaxially through the pierced cylinder 16A of the housing 16. A substantially annular frame shaped first rotary member 18B, serving as a first exposed portion, is fixed to an outer side periphery of an upper end portion of the knob base 18A so as to be coaxial to and capable of rotating as a unit with the knob base 18A. The first rotary member 18B covers an upper end portion of the pierced cylinder 16A from an upper side. A substantially annular frame shaped second rotary member 18C, serving as a second exposed portion, is fixed to an upper side of the first rotary member 18B so as to be coaxial to and capable of rotating as a unit with the first rotary member 18B. An upper end of the second rotary member 18C is rotatably fitted to an outer periphery of an upper face of the panel 14.

The first rotary member 18B and the second rotary member 18C pass through the console and are exposed to the vehicle cabin interior. The knob 18 can be operated rotationally within a predetermined range by an occupant of the vehicle (in particular, a driver seated in the driver's seat) using the first rotary member 18B and the second rotary member 18C. Shift positions can be changed by rotating the knob 18 in a first direction (the arrow X direction in FIG. 1, etc.) or a second direction (the arrow Y direction in FIG. 1, etc.). In sequence from a second direction side toward a first direction side, the knob 18 can be placed at a P position (parking position, first shift position), an R position (reverse position), an N position (neutral position, first shift position), and a D position (drive position, second shift position), respectively serving as shift positions.

In sequence from the first direction side toward the second direction side, a P slot 20A, an N slot 20B, and a D slot 20C (see FIG. 2B), these being rectangular as viewed face-on and serving as restricted portions, are formed penetrating a lower portion of a circumferential wall of the knob 18 (knob base 18A). The P slot 20A, the N slot 20B, and the D slot 20C are each open toward the lower side. The P slot 20A and the N slot 20B are separated from each other in the circumferential direction of the knob 18, whereas the N slot 20B and the D slot 20C are in communication with each other in the circumferential direction of the knob 18. The D slot 20C is formed further toward the upper side than the P slot 20A and the N slot 20B.

A substantially rectangular plate shaped sensor board (not illustrated in the drawings), serving as a detection section, is disposed at the lower side of the plate 12. The sensor board detects a rotation position of the knob 18, thereby detecting the shift position of the knob 18. The sensor board is electrically connected to a vehicle controller (not illustrated in the drawings), and an automatic transmission (not illustrated in the drawings) of the vehicle is also electrically connected to the controller. When the shift position of the knob 18 is changed, under the control of the controller, the automatic transmission is changed to a shift range corresponding to the shift position of the knob 18 (namely, a P range (parking range), an R range (reverse range), an N range (neutral range), or a D range (drive range)).

The shift device 10 is provided with a shift locking mechanism 22, serving as a restriction section.

The shift locking mechanism 22 is provided with a motor (not illustrated in the drawings) serving as a drive section. The motor is disposed at a lower side of the plate 12. The motor is electrically connected to the controller, and is driven in a positive direction or in a reverse direction under the control of the controller.

The shift locking mechanism 22 is provided with a cam gear 24, serving as a rotating member. The cam gear 24 is rotatably supported at the upper side of the plate 12, and is disposed at a front side and left side of the knob 18 (knob base 18A). The cam gear 24 is mechanically connected to the motor through a transmission mechanism (speed reduction mechanism), and when the motor is driven in the positive direction or in the reverse direction, the rotation of the motor is slowed and transmitted to the cam gear 24 through the transmission mechanism, thereby rotating the cam gear 24 in the positive direction (the arrow S direction in FIG. 1) or in the reverse direction (the arrow T direction in FIG. 1).

A peripheral face of an upper portion of the cam gear 24 is formed with a first release face 24A (see FIG. 2A), serving as a first release section. The first release face 24A is curved so as to follow a rotation direction of a circumference of the cam gear 24. A peripheral face of an up-down direction intermediate portion of the cam gear 24 is formed with a second release face 24B, serving as a second release section (see FIG. 2A). The second release face 24B is curved so as to follow the rotation direction of the circumferential of the cam gear 24, and is disposed at a positive direction side of the first release face 24A.

Figure 2A:
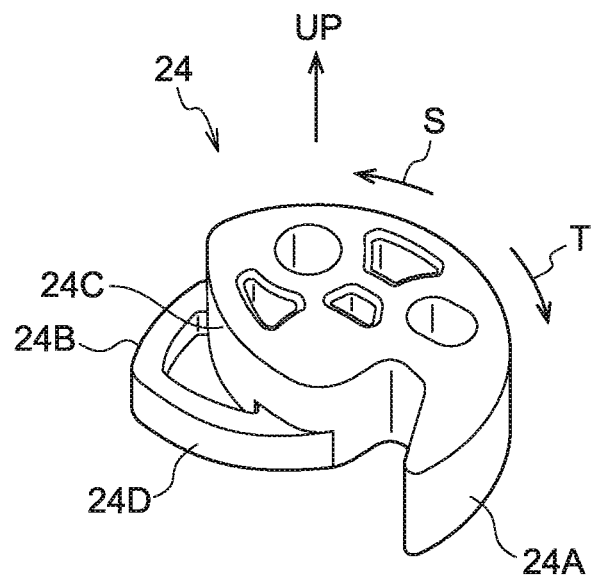
FIG. 2A is a perspective view from an upper side, illustrating relevant portions of a cam gear of a shift device according to an exemplary embodiment of the present disclosure.
Figure 2B:
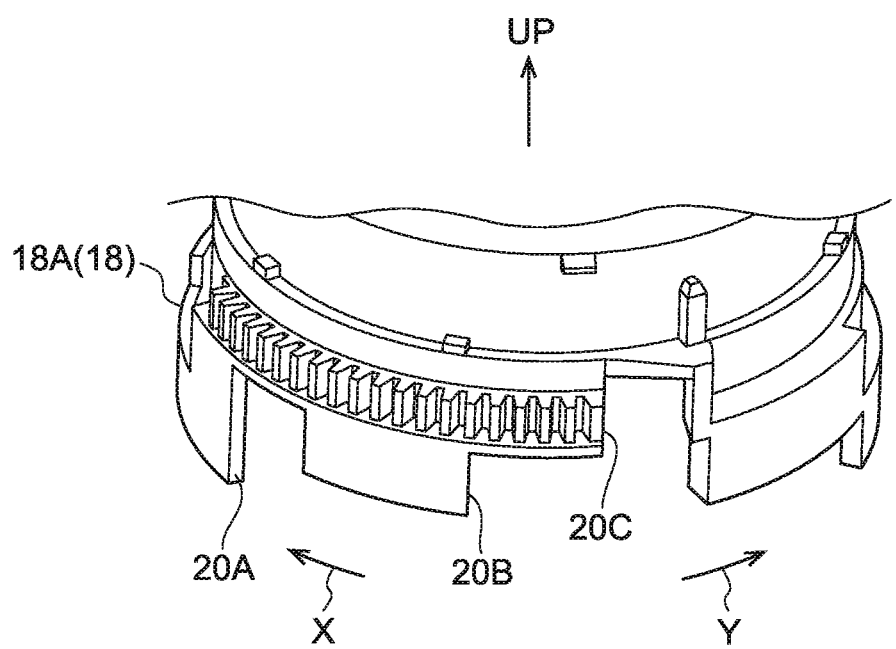
FIG. 2B is a perspective view from an upper side illustrating relevant portions of a knob base of a shift device according to an exemplary embodiment of the present disclosure.

A peripheral face, located at a positive direction side from the first release face 24A of an upper portion of the cam gear 24, is formed with a first actuation face 24C (see FIG. 2A). The first actuation face 24C serves as a first actuation portion. The first actuation face 24C is configured with a convex curve heading toward a radial direction inner side of the cam gear 24 on progression toward the positive direction side. Another peripheral face of the up-down direction intermediate portion of the cam gear 24 is formed with a second actuation face 24D (see FIG. 2A), serving as a second actuation portion, at a positive direction side of the second release face 24B. The second actuation face 24D is configured with a convex curve heading toward the radial direction inner side of the cam gear 24 on progression toward the positive direction side, and a positive direction side end portion of the second actuation face 24D lies in the same plane as a positive direction side end portion of the first actuation face 24C.

A magnet 26, serving as a detected portion, is fixed to a lower end portion of the cam gear 24 by insert molding. The magnet 26 rotates as a unit with the cam gear 24. The sensor board described above is capable of detecting the magnetism of the magnet 26, and the sensor board detects the magnetism of the magnet 26 in order to detect the rotation position of the cam gear 24. The cam gear 24 is disposed at a reference rotation position (reference position).

Figure 3A:
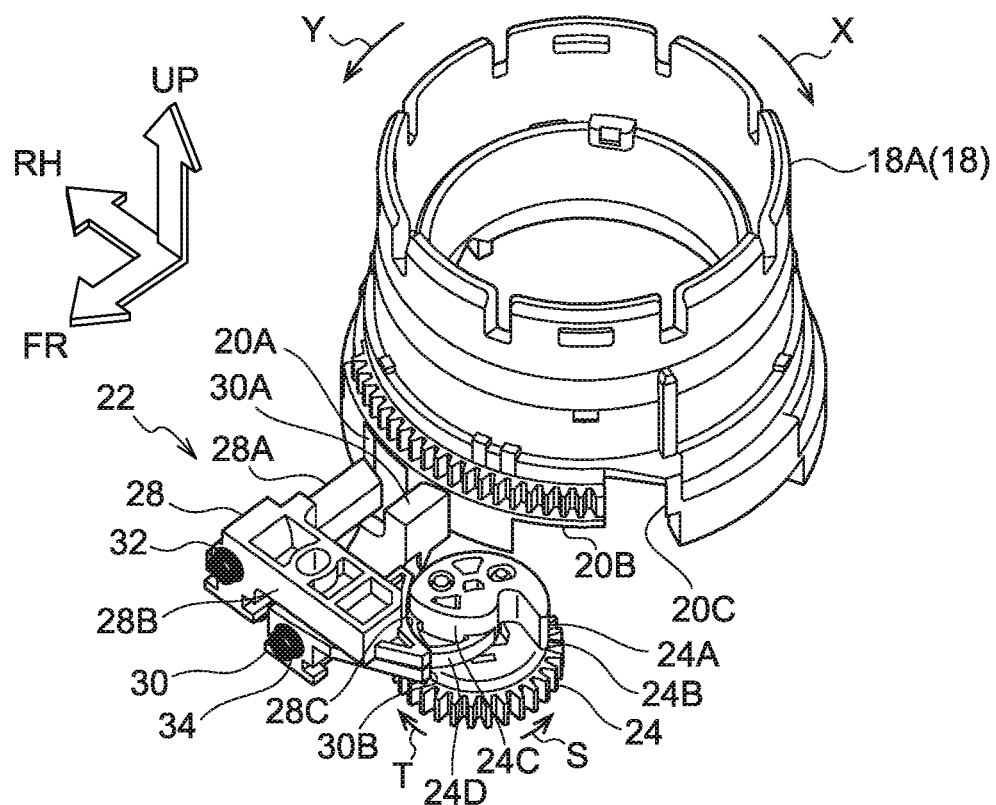
FIG. 3A is a perspective view from a front side and left side, illustrating relevant portions of a shift device according to an exemplary embodiment of the present disclosure.
Figure 3B:
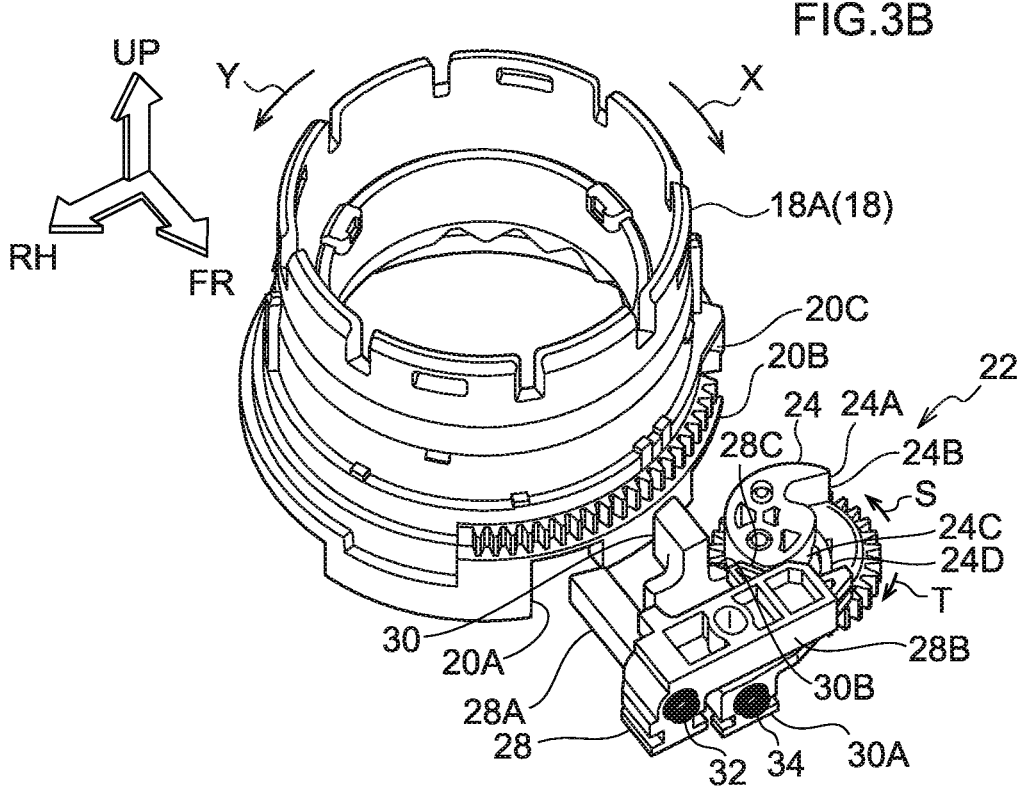
FIG. 3B is a perspective view from a front side and right side, illustrating relevant portions of a shift device according to an exemplary embodiment of the present disclosure.

A first blocker 28 (see FIG. 3A and FIG. 3B), serving as a first restriction member, is disposed at a right side of the cam gear 24. The first blocker 28 is disposed at a front side of the knob 18 (knob base 18A). The first blocker 28 is provided with a substantially rectangular block shaped first block 28A, serving as a first restriction portion. The first block 28A extends in the front-rear direction. The first block 28A is restricted from moving in a left-right direction by the upper side of the plate 12, whereas the first block 28A is capable of moving (sliding) in the front-rear direction. A front upper side portion of the first block 28A is integrally formed with a substantially rectangular block shaped overlapping portion 28B. The overlapping portion 28B extends to a left side of the first blocker 28, and is restricted from moving toward the upper side by the upper wall of the housing 16. The first blocker 28 is formed with a recessed first engagement face 28C, serving as a first engagement portion, from a rear side to a left side of a left end portion of the overlapping portion 28B. The first engagement face 28C is angled in a direction heading toward the left side on progression toward the front.

A second blocker 30 (see FIG. 3A and FIG. 3B), serving as a second restriction member, is disposed at a left side and lower side of the first blocker 28. The second blocker 30 is disposed at the front side of the knob 18 (knob base 18A). The second blocker 30 is provided with a substantially rectangular block shaped second block 30A, serving as a second restriction portion. The second block 30A extends in the front-rear direction. The second block 30A is restricted from moving in the left-right direction by the upper side of the plate 12, whereas the second block 30A is capable of moving (sliding) in the front-rear direction. A rear portion of the second block 30A projects further toward an upper side than other portions of the second block 30A, and the rear portion of the second block 30A also projects further toward the upper side than the first block 28A of the first blocker 28. The overlapping portion 28B of the first blocker 28A overlaps with a front upper side portion of the second block 30A. The overlapping portion 28B restricts movement of the second block 30A toward the upper side, while the second block 30A restricts movement of the overlapping portion 28B toward the lower side. The second blocker 30 is formed with a recessed second engagement face 30B, serving as a second engagement portion, at a left side of a portion of the second block 30A not including the rear portion of the second block 30A. The second engagement face 30B is angled in a direction heading toward the left side on progression toward the front.

A first spring 32 (coil spring, see FIG. 3A and FIG. 3B), serving as a first biasing section, spans between a front portion of the first blocker 28 and the plate 12. The first spring 32 is compressed so as to bias the first blocker 28 toward the rear side. A second spring 34 (coil spring, see FIG. 3A and FIG. 3B), serving as a second biasing section, spans between a front portion of the second blocker 30 and the plate 12. The second spring 34 is compressed so as to bias the second blocker 30 toward the rear side.

The biasing force of the first spring 32 causes the first engagement face 28C of the first blocker 28 to engage with (abut) a positive direction side end portion of the first release face 24A of the cam gear 24. Movement of the first blocker 28 toward the rear side under the biasing force of the first spring 32 is thus limited, such that the first blocker 28 is disposed at a first released position at which the first block 28A is separated from the front side of the knob 18 (knob base 18A)). The biasing force of the second spring 34 causes the second engagement face 30B of the second blocker 30 to engage with (abut) the second release face 24B of the cam gear 24, at further toward a reverse direction side from a positive direction side end portion of the second release face 24B. Movement of the second blocker 30 toward the rear side under the biasing force of the second spring 34 is thereby limited, such that the second blocker 30 is disposed at a second released position at which the second block 30A is separated from the front side of the knob 18 (knob base 18A)).

Figure 4A:
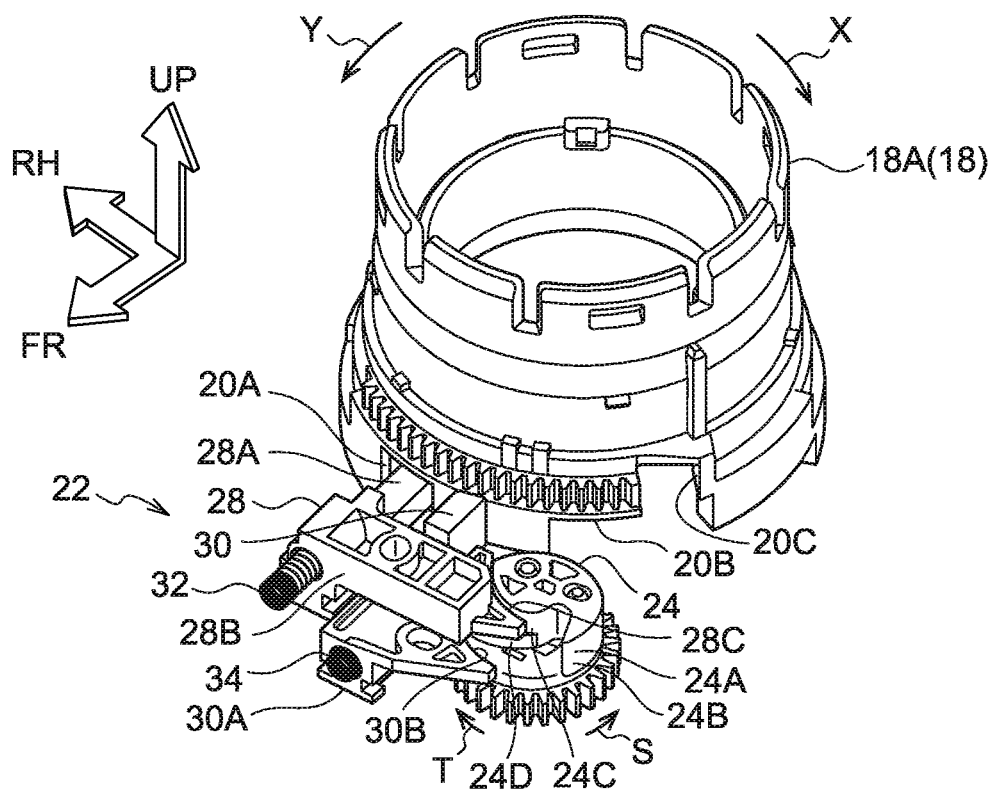
FIG. 4A is a perspective view from a front side and left side, illustrating locking of rotation of a knob at a P position in a shift device according to an exemplary embodiment of the present disclosure.
Figure 4B:
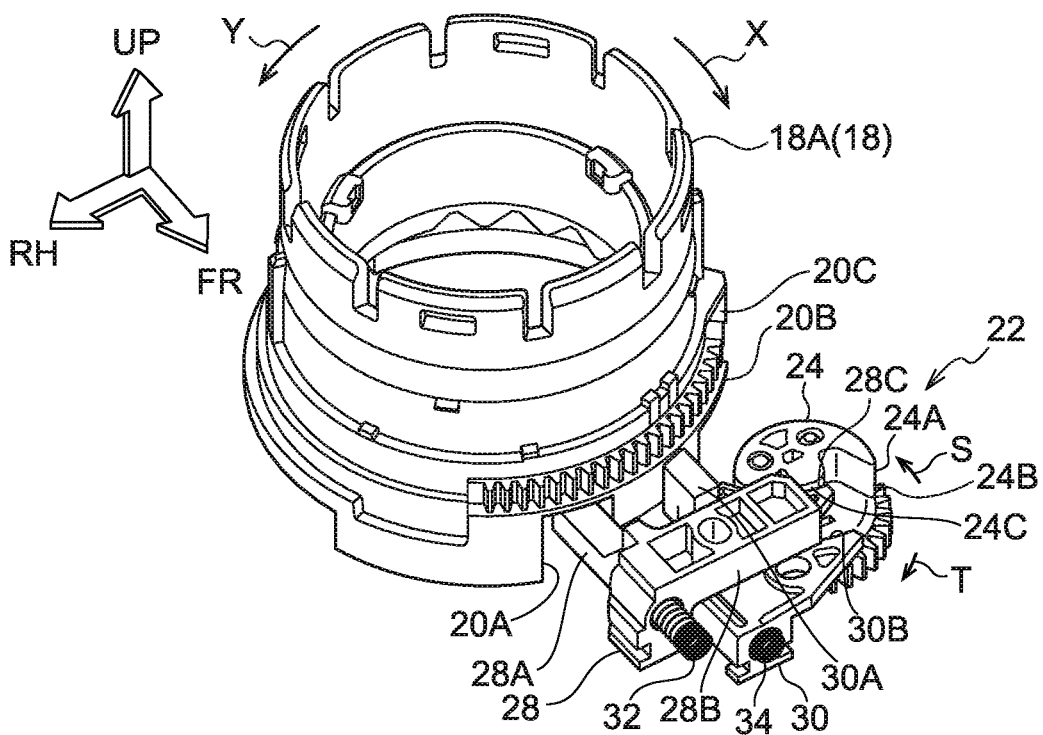
FIG. 4B is a perspective view from a front side and right side, illustrating locking of rotation of a knob at a P position in a shift device according to an exemplary embodiment of the present disclosure.

When the cam gear 24 rotates in the reverse direction from the reference rotation position such that the cam gear 24 is disposed at a first actuation position (see FIG. 4A and FIG. 4B), the engagement counterpart of the first engagement face 28C of the first blocker 28 changes from the first release face 24A to the first actuation face 24C of the cam gear 24. Accordingly, the biasing force of the first spring 32 moves (actuates) the first blocker 28 so as to move from the first released position toward the rear side, thereby disposing the first blocker 28 at a first moved position. The engagement counterpart of the second engagement face 30B of the second blocker 30 is still the second release face 24B of the cam gear 24, and so the second blocker 30 continues to be disposed at the second released position.

Figure 5A:
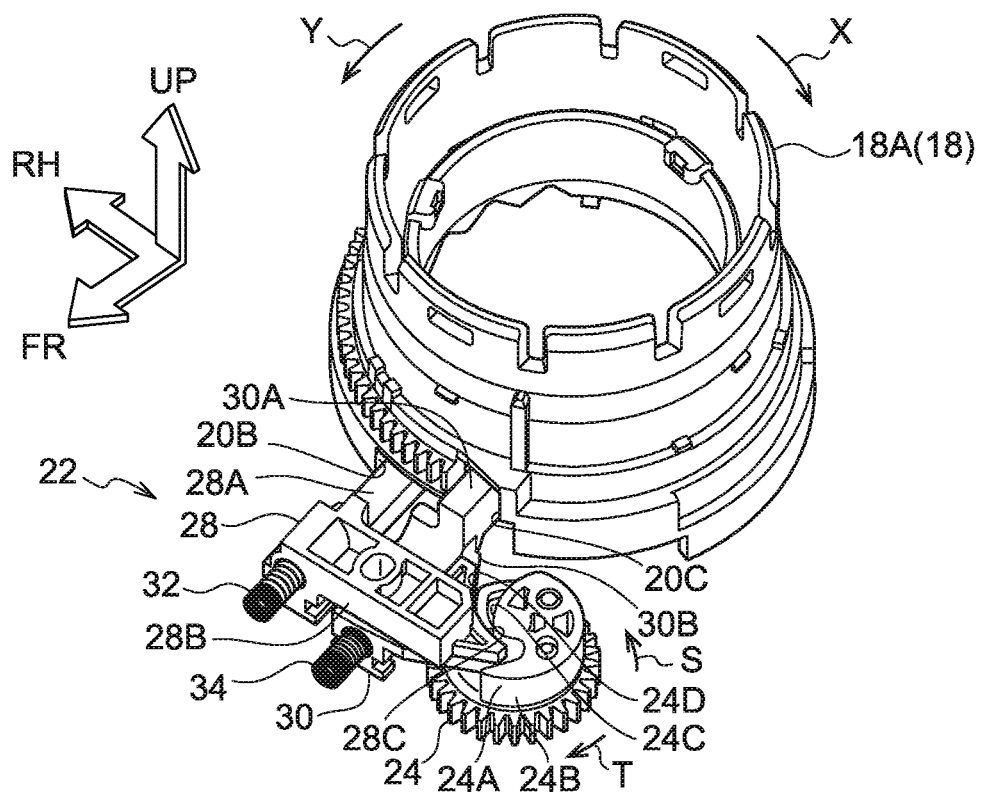
FIG. 5A is a perspective view from a front side and left side, illustrating locking of rotation of a knob at an N position in a shift device according to an exemplary embodiment of the present disclosure.
Figure 5B:
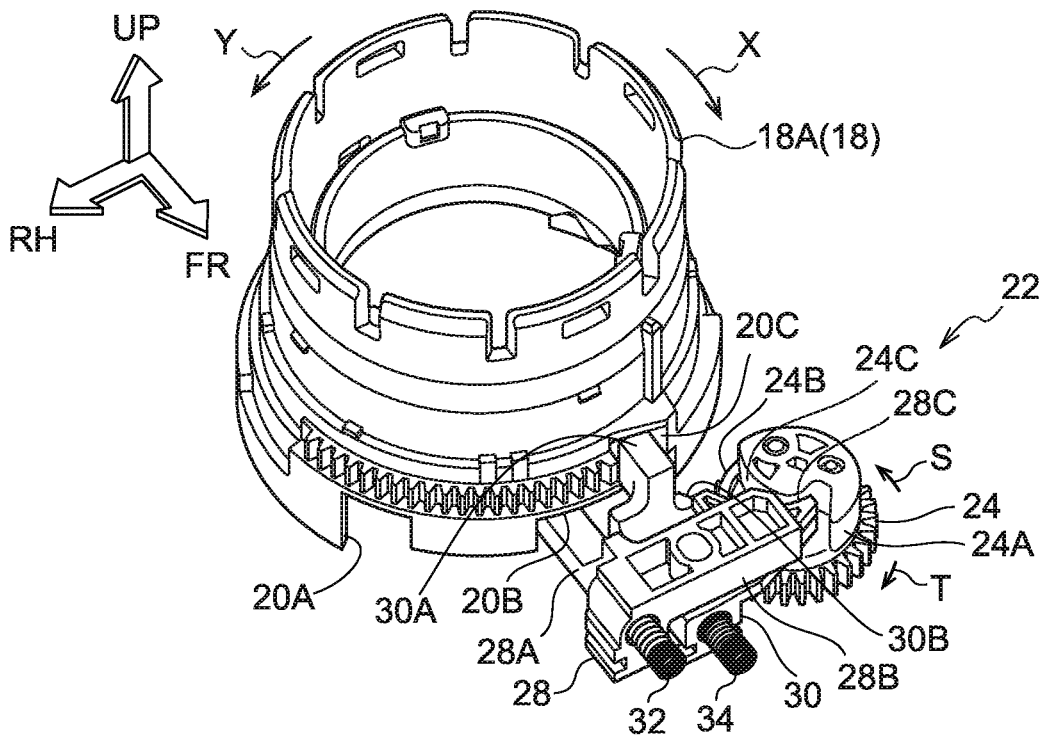
FIG. 5B is a perspective view from a front side and right side, illustrating locking of rotation of a knob at an N position in a shift device according to an exemplary embodiment of the present disclosure.

When the cam gear 24 rotates in the reverse direction from the first actuation position such that the cam gear 24 is disposed at a second actuation position (see FIG. 5A and FIG. 5B), the engagement counterpart of the second engagement face 30B of the second blocker 30 changes from the second release face 24B to the second actuation face 24D of the cam gear 24. Accordingly, the biasing force of the second spring 34 moves (actuates) the second blocker 30 so as to move from the second released position toward the rear side, thereby disposing the second blocker 30 at a second moved position. The engagement counterpart of the first engagement face 28C of the first blocker 28 is still the first actuation face 24C of the cam gear 24, and so the first blocker 28 continues to be disposed at the first moved position.

A vehicle brake (not illustrated in the drawings), serving as a restriction release section, is electrically connected to the controller. Operation of the brake by an occupant restricts movement of the vehicle. A lock switch (not illustrated in the drawings), serving as a restriction operation section, is also electrically connected to the controller. The occupant can perform a locking operation (a restriction operation) and an unlocking operation (a restriction-release operation) with the lock switch.

Next, explanation follows regarding operation of the present exemplary embodiment.

In the shift device 10 configured as described above, the shift position of the knob 18 is changed to the P position, the R position, the N position, or the D position by rotation operating the knob 18.

In cases in which the knob 18 is disposed at the P position (in cases in which the sensor board has detected that the shift position of the knob 18 is the P position) and the brake is not operated, the motor of the shift locking mechanism 22 is driven in reverse under the control of the controller, such that the cam gear 24 is rotated in the reverse direction through the transmission mechanism. From the reference rotation position, the cam gear 24 is thus disposed at the first actuation position. Accordingly, the engagement counterpart of the first engagement face 28C of the first blocker 28 changes from the first release face 24A to the first actuation face 24C of the cam gear 24, and the first blocker 28 is moved toward the rear side, from the first released position to the first moved position, by the biasing force of the first spring 32 (see FIG. 4A, FIG. 4B, and column A in FIG. 6). Moreover, when the first blocker 28 has been moved to the first moved position (when the sensor board has detected that the cam gear 24 has been disposed at the first actuation position), the reverse drive of the motor is stopped under the control of the controller. A rear portion of the first block 28A of the first blocker 28 is thus inserted into the P slot 20A of the knob 18, such that a face on a second direction side of the P slot 20A is abutted by the first block 28A. Rotation of the knob 18 from the P position toward a first direction side (R position side) is thus locked (restricted).

Conversely, in cases in which the knob 18 is disposed at the P position (in cases in which the sensor board has detected that the shift position of the knob 18 is the P position) and the brake has been operated, the motor of the shift locking mechanism 22 is driven in the positive direction under the control of the controller, such that the cam gear 24 is rotated in the positive direction through the transmission mechanism. From the first actuation position, the cam gear 24 is thus disposed at the reference rotation position. Accordingly, the engagement counterpart of the first engagement face 28C of the first blocker 28 changes from the first actuation face 24C to the first release face 24A of the cam gear 24, and the first blocker 28 is moved toward the front side, from the first moved position toward the first released position, against the biasing force of the first spring 32 (see FIG. 3A, FIG. 3B, and column A in FIG. 6). Moreover, when the first blocker 28 has been moved to the first released position (when the sensor board has detected that the cam gear 24 has been disposed at the reference rotation position), the positive drive of the motor is stopped under the control of the controller. The first block 28A is thus no longer inserted into the P slot 20A, permitting the knob 18 to rotate from the P position toward the first direction side (R position side).

Moreover, in cases in which the knob 18 is disposed at the N position (in cases in which the sensor board has detected that the shift position of the knob 18 is the N position) and the lock switch has been lock operated, the motor of the shift locking mechanism 22 is driven in the reverse direction under the control of the controller, such that the cam gear 24 is rotated in the reverse direction through the transmission mechanism. From the reference rotation position, the cam gear 24 passes the first actuation position to be disposed at the second actuation position. Accordingly, the engagement counterpart of the first engagement face 28C of the first blocker 28 changes from the first release face 24A to the first actuation face 24C of the cam gear 24, and the first blocker 28 is moved toward the rear side, from the first released position to the first moved position, by the biasing force of the first spring 32. Moreover, the engagement counterpart of the second engagement face 30B of the second blocker 30 changes from the second release face 24B to the second actuation face 24D of the cam gear 24, and the second blocker 30 is moved toward the rear side, from the second released position to the second moved position, by the biasing force of the second spring 34 (see FIG. 5A and FIG. 5B, and column E in FIG. 6). Then, when the first blocker 28 has moved to the first moved position and the second blocker 30 has moved to the second moved position (when the sensor board has detected that the cam gear 24 is disposed at the second actuation position), the reverse drive of the motor is stopped under the control of the controller. The rear portion of the first block 28A of the first blocker 28 is thus inserted into the N slot 20B of the knob 18, and the rear portion of the second block 30A of the second blocker 30 is inserted into an upper side portion of the D slot 20C of the knob 18, such that a face on a first direction side of the N slot 20B is abutted by the first block 28A and a face on a second direction side of the D slot 20C is abutted by the second block 30A, respectively. Rotation of the knob 18 from the N position toward the first direction side (D position side) and the second direction side (R position side) is thus locked.

When the lock switch is unlock-operated, the motor of the shift locking mechanism 22 is driven in the positive direction under the control of the controller, such that the cam gear 24 is rotated in the positive direction through the transmission mechanism. From the second actuation position, the cam gear 24 passes the first actuation position to be disposed at the reference rotation position. Accordingly, the engagement counterpart of the first engagement face 28C of the first blocker 28 changes from the first actuation face 24C to the first release face 24A of the cam gear 24, and the first blocker 28 is moved toward the front side, from the first moved position to the first released position, against the biasing force of the first spring 32, and the engagement counterpart of the second engagement face 30B of the second blocker 30 changes from the second actuation face 24D to the second release face 24B of the cam gear 24, such that the second blocker 30 is moved toward the front side, from the second moved position to the second released position, against the biasing force of the second spring 34 (see column E in FIG. 6). Moreover, when the first blocker 28 has moved to the first released position and the second blocker 30 has moved to the second released position (when the sensor board has detected that the cam gear 24 has been disposed at the reference rotation position), the positive drive of the motor is stopped under the control of the controller. The first block 28A is thus no longer inserted into the N slot 20B and the second block 30A is no longer inserted into the D slot 20C, permitting the knob 18 to rotate from the N position toward the first direction side and the second direction side.

Moreover, in cases in which the knob 18 is disposed at the N position or the D position (in cases in which the sensor board has detected that the shift position of the knob 18 is the N position or the D position) and the brake is not operated, the motor of the shift locking mechanism 22 is driven in reverse under the control of the controller, such that the cam gear 24 is rotated in the reverse direction through the transmission mechanism. From the reference rotation position, the cam gear 24 is disposed at the first actuation position. Accordingly, the engagement counterpart of the first engagement face 28C of the first blocker 28 changes from the first release face 24A to the first actuation face 24C of the cam gear 24, and the first blocker 28 is moved toward the rear side, from the first released position to the first moved position, by the biasing force of the first spring 32 (see column C and column D in FIG. 6). Moreover, when the first blocker 28 has moved to the first moved position (when the sensor board has detected that the cam gear 24 is disposed at the first actuation position), the reverse drive of the motor is stopped under the control of the controller. The rear portion of the first block 28A of the first blocker 28 is thus inserted into the N slot 20B or a lower side portion of the D slot 20C in the knob 18, such that the face on the second direction side of the N slot 20B is abutted by the first block 28A. Rotation of the knob 18 is thus locked within a range from the N position to the D position toward the second direction side (R position side).

Conversely, in cases in which the knob 18 is disposed at the N position or the D position (in cases in which the sensor board has detected that the shift position of the knob 18 is the N position or the D position) and the brake has been operated, the motor of the shift locking mechanism 22 is driven in the positive direction under the control of the controller, such that the cam gear 24 is rotated in the positive direction through the transmission mechanism. From the first actuation position, the cam gear 24 is thus disposed at the reference rotation position. Accordingly, the engagement counterpart of the first engagement face 28C of the first blocker 28 changes from the first actuation face 24C to the first release face 24A of the cam gear 24, and the first blocker 28 is moved toward the front side, from the first moved position toward the first released position, against the biasing force of the first spring 32 (see column C in FIG. 6). Moreover, when the first blocker 28 has moved to the first released position (when the sensor board has detected that the cam gear 24 has been disposed at the reference rotation position), the positive drive of the motor is stopped under the control of the controller. The first block 28A is thus no longer inserted into the N slot 20B or the D slot 20C, permitting the knob 18 to rotate outside of the range from the N position to the D position toward the second direction side (R position side).

Note that as illustrated in column B of FIG. 6, rotation of the knob 18 is never locked at the R position.

As described above, in the shift locking mechanism 22, not only are the first blocker 28 and the second blocker 30 moved to the first moved position and the second moved position respectively to lock rotation of the knob 18 at the N position, but the first blocker 28 is also moved to the first moved position to lock rotation of the knob 18 within the range from the N position to the D position. Accordingly, providing the shift locking mechanism 22 with the first blocker 28 and the second blocker 30 not only enables rotation of the knob 18 to be locked at the N position, but also enables rotation of the knob 18 to be locked within the range from the N position to the D position.

Moreover, the cam gear 24 is rotated in the reverse direction from the reference rotation position to the first actuation position in order to move the first blocker 28 to the first moved position, and the cam gear 24 is rotated in the reverse direction from the first actuation position to the second actuation position in order to move the second blocker 30 to the second moved position. This thereby enables the first blocker 28 and the second blocker 30 to be respectively moved to the first moved position and the second moved position with a simple configuration.

Moreover, the first engagement face 28C of the first blocker 28 is moved by reverse direction rotation of the first actuation face 24C of the cam gear 24 such that the first blocker 28 is moved to the first moved position, and the second engagement face 30B of the second blocker 30 is moved by reverse direction rotation of the second actuation face 24D of the cam gear 24 such that the second blocker 30 is moved to the second moved position. This thereby enables the first blocker 28 and the second blocker 30 to be respectively moved to the first moved position and the second moved position by rotating the cam gear 24 in the reverse direction.

Moreover, the overlapping portion 28B of the first blocker 28 overlaps with the front upper side portion of the second block 30A of the second blocker 30. The overlapping portion 28B is thus capable of restricting movement of the second blocker 30 toward the upper side, while the second block 30A is capable of restricting movement of the first blocker 28 toward the lower side. This thereby enables rattling at the upper side of the second blocker 30 and rattling at the lower side of the first blocker 28 to be suppressed with a simple configuration.

Moreover, the first blocker 28 is only moved to the first moved position toward the rear side, and the second blocker 30 is only moved to the second moved position toward the rear side. There is therefore no need for the first blocker 28 and the second blocker 30 to be respectively moved to plural moved positions toward the rear side, enabling the front-rear direction movement strokes of the first blocker 28 and the second blocker 30 to be made shorter, thereby enabling a reduction in the front-rear direction size of the shift device 10.

Note that in the present exemplary embodiment, when the first blocker 28 is inserted into the N slot 20B of the knob 18, and when the second blocker 30 is inserted into the upper side portion of the D slot 20C of the knob 18, the face on the first direction side of the N slot 20B is abutted by the first blocker 28 and the face on the second direction side of the D slot 20C is abutted by the second blocker 30, thereby locking rotation of the knob 18 from the N position toward the first direction side and the second direction side. However, configuration may be made such that the second blocker 30 is inserted into the upper side portion of the D slot 20C of the knob 18 without inserting the first blocker 28 into the N slot 20B of the knob 18, such that a face on the first direction side and a face on the second direction side of the D slot 20C are abutted by the second blocker 30, so as to lock rotation of the knob 18 from the N position toward the first direction side and the second direction side.

Moreover, in the present exemplary embodiment, the shift locking mechanism 22 locks rotation of the knob 18 when the knob 18 is at the P position and at the N position.

However, configuration may be made in which the shift locking mechanism 22 locks rotation of the knob 18 when the knob 18 is at a shift position other than the P position and the N position (for example, the R position or the D position).

In the present exemplary embodiment, the shift locking mechanism 22 locks rotation of the knob 18 within the range from the N position to the D position. However, configuration may be made in which the shift locking mechanism 22 locks rotation of the knob 18 within a range of plural shift positions other than the range from the N position to the D position (for example, a range from the R position to the D position).

Moreover, in the present exemplary embodiment, the shift locking mechanism 22 is provided at a location where the plate 12, the panel 14, and the housing 16 are disposed. And the first blocker 28 and the second blocker 30 of the shift locking mechanism 22 engage with the knob 18. However, configuration may be made in which the shift locking mechanism 22 is provided at a location at the knob 18, and the first blocker 28 and the second blocker 30 of the shift locking mechanism 22 engage with locations at the plate 12, the panel 14, and the housing 16.

Moreover, in the present exemplary embodiment, the knob 18 (shift body) is rotated. However, configuration may be made in which a shift body swings or slides.

Moreover, in the present exemplary embodiment, the shift device 10 is installed to the console. However, configuration may be made in which the shift device 10 is installed to a floor of the vehicle cabin, an instrument panel, or a steering column cover.

What is claimed is:

1. A shift device for a vehicle, the shift device comprising:
a shift body that is moved to change a shift position;
a restriction section provided with a first restriction member and a second restriction member, configured such that actuation of the first restriction member restricts movement of the shift body to a plurality of shift positions or within a shift range, and configured such that actuation of the first restriction member and the second restriction member, or actuation of the second restriction member alone, restricts movement of the shift body to the shift position, and
a rotating member that rotates to actuate the first restriction member and the second restriction member, wherein:
the rotating member is formed, at an upper portion of an outer peripheral face thereof, with a first actuation portion that actuates the first restriction member,
the rotating member is formed, at a lower portion of the outer peripheral face thereof, with a second actuation portion that actuates the second restriction member, and
the upper portion and the lower portion are located at different locations in a rotational direction at the outer peripheral face of the rotating member, wherein:
a restricted portion is formed penetrating the shift body;
the first restriction member is slidable between a first moved position where the first restriction member is inserted into the restricted portion and a first released position where the insertion of the first restriction member into the restricted portion is released; and
the second restriction member is slidable between a second moved position where the second restriction member is inserted into the restricted portion and a second released position where the insertion of the second restriction member into the restricted portion is released.

2. The shift device of claim 1, wherein:
the first actuation portion actuates the first restriction member in a case in which the rotating member is rotated; and
the second actuation portion actuates the second restriction member in the case in which the rotating member is rotated.

3. The shift device of claim 1, wherein the first restriction member and the second restriction member are disposed so as to be superimposed one on another in a direction of a rotation axis of the rotating member.

4. A shift device for a vehicle, the shift device comprising:
a shift body that is moved to change a shift position;
a restriction section provided with a first restriction member and a second restriction member, configured such that actuation of the first restriction member restricts movement of the shift body to a plurality of shift positions or within a shift range, and configured such that actuation of the first restriction member and the second restriction member, or actuation of the second restriction member alone, restricts movement of the shift body to the shift position, and
a rotating member that rotates to actuate the first restriction member and the second restriction member, wherein:
the rotating member is formed, at an upper portion of an outer peripheral face thereof, with a first actuation portion that actuates the first restriction member,
the rotating member is formed, at a lower portion of the outer peripheral face thereof, with a second actuation portion that actuates the second restriction member, and
the upper portion and the lower portion are located at different locations in a rotational direction at the outer peripheral face of the rotating member, wherein:
in a case in which the shift body is disposed at a P position, actuation of the first restriction member restricts movement of the shift body to the plurality of shift positions or within the shift range; and
in a case in which the shift body is disposed at a N position, actuation of the first restriction member and the second restriction member, or actuation of the second restriction member alone, restricts movement of the shift body to the shift position.

* * * * *